(12) United States Patent
Shibasaki

(10) Patent No.: US 11,508,398 B2
(45) Date of Patent: Nov. 22, 2022

(54) MAGNETIC DISK DEVICE AND CONTROL METHOD FOR MAGNETIC DISK DEVICE

(71) Applicants: KABUSHIKI KAISHA TOSHIBA, Tokyo (JP); TOSHIBA ELECTRONIC DEVICES & STORAGE CORPORATION, Tokyo (JP)

(72) Inventor: Takeshi Shibasaki, Kamakura Kanagawa (JP)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 0 days.

(21) Appl. No.: 17/386,214

(22) Filed: Jul. 27, 2021

(65) Prior Publication Data
US 2022/0076695 A1   Mar. 10, 2022

(30) Foreign Application Priority Data

Sep. 4, 2020   (JP) .............................. JP2020-149251

(51) Int. Cl.
*G11B 20/18* (2006.01)
*G11B 5/012* (2006.01)

(52) U.S. Cl.
CPC .................... *G11B 5/012* (2013.01)

(58) Field of Classification Search
CPC ..... G11B 20/1889; G11B 7/1267; G11B 7/00; G11B 7/00736; G11B 7/1263; G11B 20/10009; G11B 20/10481; G11B 5/6029; G11B 5/59627; G11B 27/36; G11B 5/09; G11B 20/18; G06F 3/0619; G06F 3/0644; G06F 3/0659; G06F 3/0674; G06F 11/676; G06F 11/0727; G06F 11/0787
USPC ............................ 360/31, 48, 75; 369/53.15
See application file for complete search history.

(56) References Cited

U.S. PATENT DOCUMENTS

| | | | |
|---|---|---|---|
| 9,099,155 B1 | 8/2015 | Kataria et al. | |
| 9,330,701 B1* | 5/2016 | Michel | G11B 20/1816 |
| 10,490,223 B2 | 11/2019 | Isokawa | |
| 10,832,728 B2* | 11/2020 | Eda | G06F 3/0659 |
| 2008/0239548 A1* | 10/2008 | Paul | G11B 20/1883 360/75 |
| 2010/0157466 A1 | 6/2010 | Inoue | |
| 2019/0198054 A1* | 6/2019 | Isokawa | G11B 20/1037 |

* cited by examiner

*Primary Examiner* — Nabil Z Hindi
(74) *Attorney, Agent, or Firm* — Allen & Overy LLP

(57) ABSTRACT

According to one embodiment, a magnetic disk device includes a magnetic disk, a head and a controller. The head writes data to the magnetic disk and reads data from the magnetic disk. The controller once reads the data written to a predetermined recording area according to the number of writes of data to the predetermined recording area of the magnetic disk and rewrites the read data to the predetermined recording area. The controller adjusts an additive value to the number of writes based on the presence or absence of a defect on the recording surface of the magnetic disk.

7 Claims, 6 Drawing Sheets

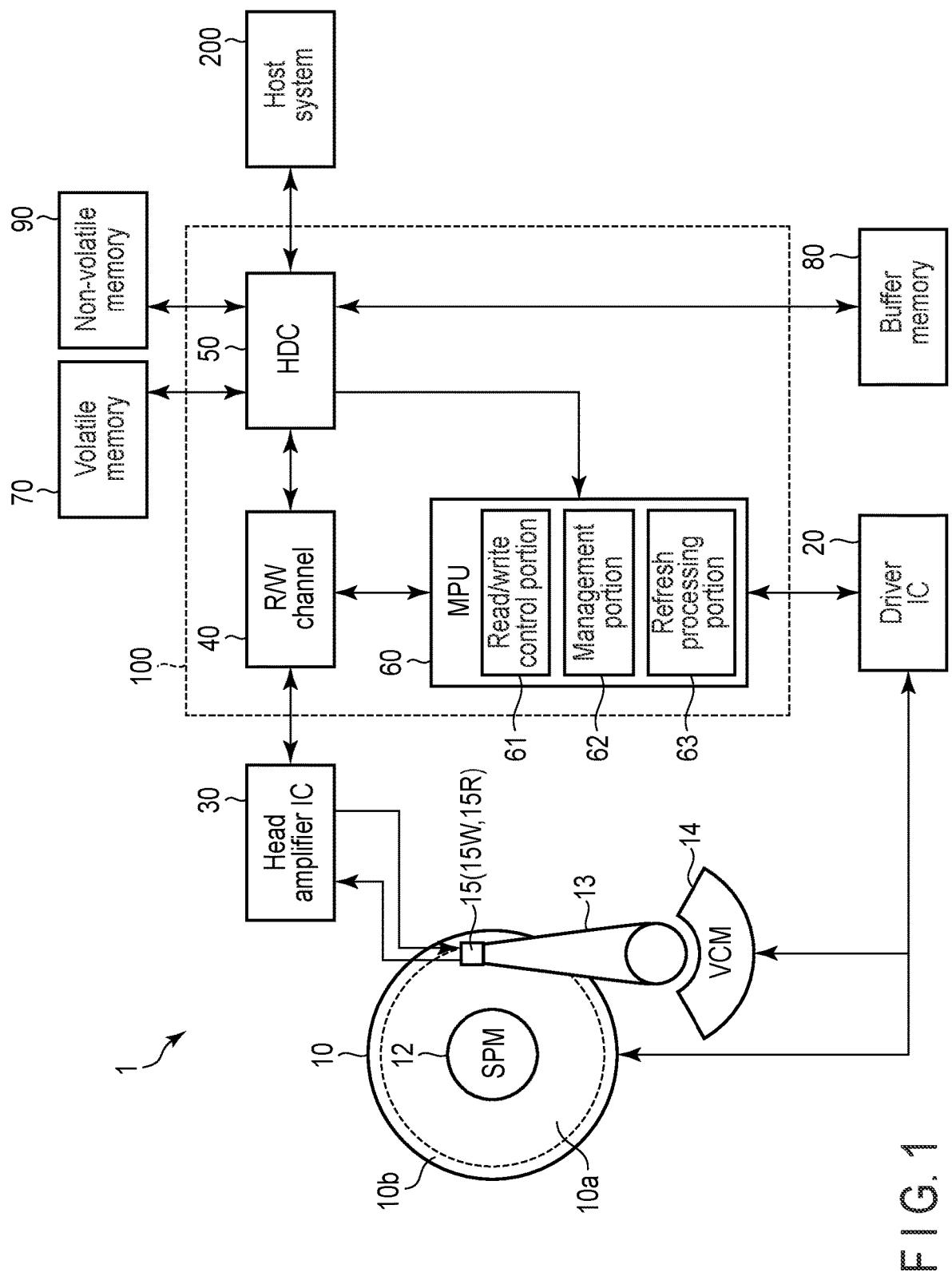
F I G. 1

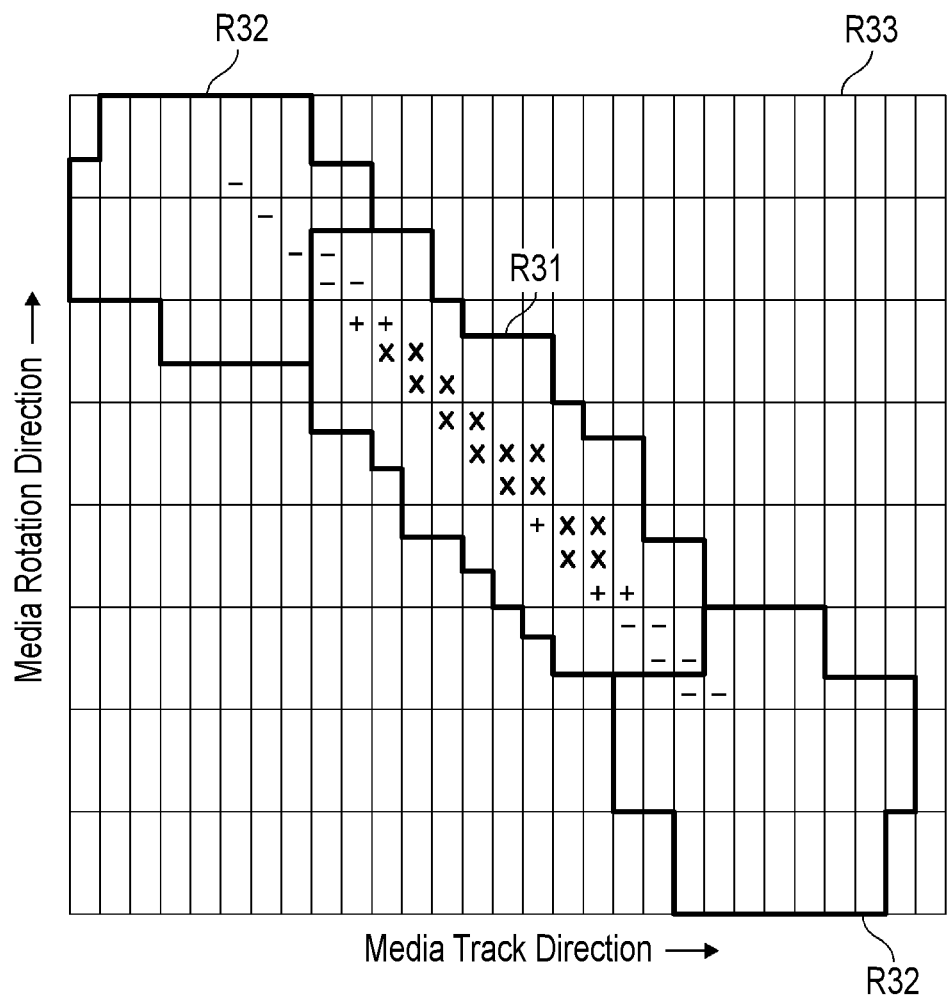
F I G. 3

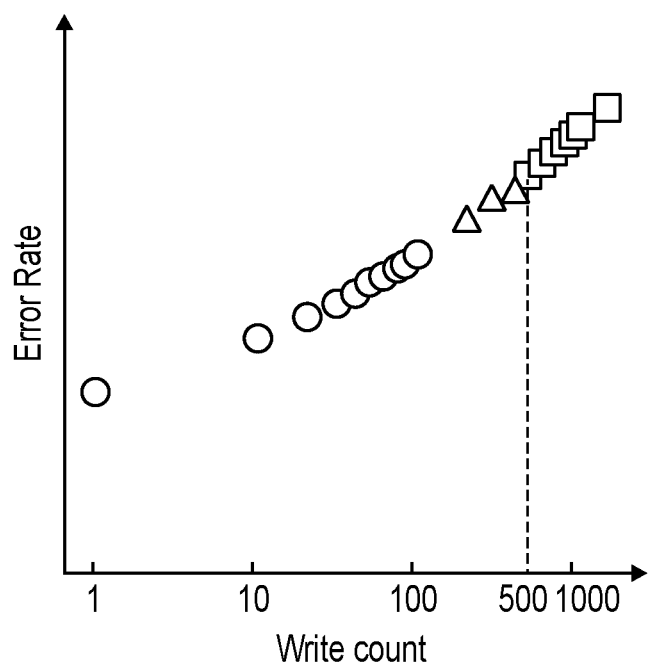
F I G. 6

MAGNETIC DISK DEVICE AND CONTROL METHOD FOR MAGNETIC DISK DEVICE

CROSS-REFERENCE TO RELATED APPLICATIONS

This application is based upon and claims the benefit of priority from Japanese Patent Application No. 2020-149251, filed Sep. 4, 2020, the entire contents of which are incorporated herein by reference.

FIELD

Embodiments described herein relate generally to a magnetic disk device and a method of controlling the magnetic disk.

BACKGROUND

On surfaces (recording surfaces) of disks mounted on magnetic disk devices, defects such as minute scratches (recessed areas) and minute projections (projecting areas) including spatter flakes are present. Such defects may be a factor which interferes with the normal writing and reading of data on the disk, and can also damage the head. For this reason, in magnetic disk drives, the location of a defect is registered in advance as defect information. An area registered as containing a defect is excluded from the recording area of the disk, for example, by not assigning the logical block addressing (LBA) to the area.

The location of a defect on the disk surface can be detected by, for example, a tone scan method in which data is written to the disk and then read out and the difference between these data is detected, a scan method using the head disk interface (HDI) sensor, or a scan method utilizing adjacent write.

In the method utilizing adjacent writes, data is written to a track adjacent to a given track so as to promote read errors of data from the given track, and thus the defects are investigated. With this configuration, in the method utilizing the adjacent write, as the number of times of adjacent write is greater, that is, as the more times of write to the adjacent track, the accuracy of the detection of defects becomes higher. On the other hand, the greater the number of adjacent writes, the longer the detection time, thus lowering the feasibility. Therefore, depending on the number of adjacent writes carried out, there is a possibility that minute defects, such as minute scratches (thin scratches) that are not registered as defect information, may exist in areas other than the area where defect information is registered.

A sector in which such a minute defect exists does not lead to a read error in a single data write, but if the number of adjacent writes increases, it may result in a read error sooner than a sector without the defect.

An object of the embodiments is to provide a magnetic disk device which can suppress data, even if a minute defect such as a thin scratch exists in an area other than the area where the defect information is registered, from being regarded as a read error due to the minute defect, and a control method for such a magnetic disk.

BRIEF DESCRIPTION OF THE DRAWINGS

FIG. 1 is a block diagram showing a schematic configuration of a magnetic disk device according to an embodiment.

FIG. 3 is a diagram schematically showing an example of the settings of the normal recording area, Plist area, and Plist peripheral area in the case where the defects are continuous along a direction inclined to the radial direction on the recording surface of the disk of the magnetic disk device according to the embodiment.

FIG. 6 is a diagram showing the relationship between the write count of a track comprising only proper sectors with no defects and the error rate in the magnetic disk device according to the embodiment.

DETAILED DESCRIPTION

Figure 2:
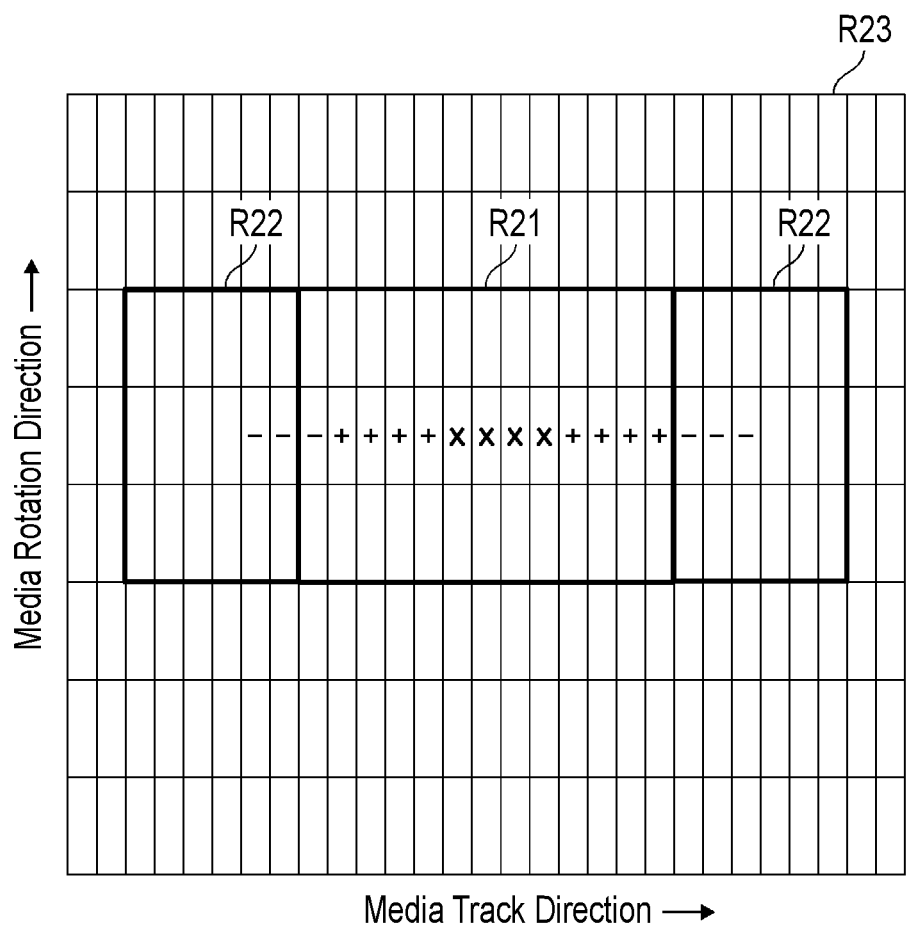
FIG. 2 is a diagram schematically showing an example of the settings of a normal recording area, Plist area, and Plist peripheral area in the case where defects are continuous along a radial direction on a recording surface of a disk of a magnetic disk device according to the embodiment.

In general, according to one embodiment, a magnetic disk device includes a magnetic disk, a head and a controller. The head writes data to the magnetic disk and reads data from the magnetic disk. The controller once reads the data written to a predetermined recording area according to the number of writes of data to the predetermined recording area of the magnetic disk and rewrites the read data to the predetermined recording area. The controller adjusts an additive value of the number of writes based on the presence or absence of a defect on the recording surface of the magnetic disk.

Magnetic disk devices according to the embodiments will be described with reference to FIGS. 1 to 7.

FIG. 1 is a block diagram showing a schematic configuration of a magnetic disk device 1 according to an embodiment. As shown in FIG. 1, the magnetic disk device 1 comprises a head disk assembly (HDA), which will be described later, a driver IC 20, a head amplifier integrated circuit, (which will be referred to as a head amplifier IC, hereinafter) 30, a volatile memory 70, a buffer memory (buffer) 80, a non-volatile memory 90 and a system controller 100. Further, the magnetic disk drive 1 is connected to a host system, (which will be simply referred to as a host, hereinafter) 200.

The HDA includes a magnetic disk, (which will be referred to as a disk, hereinafter) 10, a spindle motor, (which will be referred to as SPM, hereinafter) 12, an arm 13 on which a head 15 is mounted, and a voice coil motor, (which will be referred to as VCM, hereinafter) 14. The disk 10 is mounted on the spindle motor 12 and is rotated as driven by the spindle motor 12. The arm 13 and VCM 14 constitute an actuator. The actuator is driven by the VCM 14 to control the head 15, which is mounted on the arm 13, to move to a target position on the disk 10. The number of disks 10 and heads 15 is not limited to one, but may be multiple.

To the disk 10, a user data area 10*a*, which is available from the user and a system area 10*b*, which is used to write information necessary for system management, are assigned in its data writable area. Note that the direction perpendicular to the radial direction of the disk 10 is referred to as the circumferential direction, hereinafter.

The head 15 comprises, on a slider as its main body, a write head 15W and a read head 15R mounted on the slider. The write head 15W writes data on the disk 10 (write). The read head 15R reads data recorded on a data track on the disk 10 (read).

The driver IC 20 controls the driving of the SPM 12 and VCM 14 according to the control of the system controller 100 (in detail, the MPU 60, which will be described later).

The head amplifier IC 30 comprises a read amplifier and a write driver. The read amplifier amplifies the read signal read from the disk 10 and outputs it to the system controller 100 (in detail, the read/write (R/W) channel 40, which will be described later). The write driver outputs a write current according to the signal output from the R/W channel 40, to the head 15.

The volatile memory 70 is a semiconductor memory in which the stored data is lost when the power supply is cut off. The volatile memory 70 stores data, etc., necessary for processing in each part of the magnetic disk drive 1. The volatile memory 70 is, for example, dynamic random access memory (DRAM) or synchronous dynamic random access memory (SDRAM).

The buffer memory 80 is a semiconductor memory that temporarily records data, etc., transmitted and received between the magnetic disk drive 1 and the host 200. The buffer memory 80 may be configured as being integrated with the volatile memory 70 as one body. The buffer memory 80 is, for example, DRAM, a static random access memory (SRAM), SDRAM, a ferroelectric random access memory (FeRAM), or a magneto resistive random access memory (MRAM), or the like.

The non-volatile memory 90 is a semiconductor memory that records data to be stored even when the power supply is cut off. The non-volatile memory 90 is, for example, a NOR or NAND flash read-only memory (FROM).

The non-volatile memory 90 holds defect information, (which will be referred to as "Plist", hereinafter). The Plist is a set of information indicating the location of defects present on the surface (recording surface) of the disk 10. The presence/absence of defects is detected, for example, in the quality inspection of the disk 10 before shipment of the product, (which is, for example, the magnetic disk drive 1). The Plist registers various kinds of information such as the cylinder number, sector number, sector length and head number, where the defects are present, while they are linked to each other. The cylinder number (address) indicates the cylinder position of the track on the disk 10 where the corresponding defect exists. The sector number and sector length indicate the position of the sector in which the corresponding defect exists (or the position of the first sector if the defect is located over multiple sectors) and the number of sectors. The head number indicates the recording surface of the disk 10 where the corresponding defect exists.

Plist registers not only the sectors where the defects actually exist, but also predetermined sectors adjacent to those sectors (adjacent sectors) as margins. Therefore, the sector number and sector length registered in the Plist are greater than the sector number and sector length of the sector where the defect is actually detected. In other words, the area registered in the Plist includes not only the sector where the defect is actually detected, but also the predetermined sectors adjacent to that sector. The area registered in the Plist is classified as the first area of the recording area of the disk 10, and will be hereinafter referred to as a Plist area. Further, the adjacent sectors described above are sectors where the presence of defects is not detected, but where defects smaller than the defect (hereinafter referred to as "minute defects"), such as small scratches, actually exist or may exist, and are added to the Plist area as margins.

The Plist area is excluded from the recording area of the disk 10, for example, by not assigning LBA to the area. In other words, the Plist area contains a defect and is not used as a recording area of the disk 10. Thus, data writing and reading errors to and from the disk 10 and damage to the head 15 can be suppressed.

As described above, the Plist registers not only the sectors where defects actually exist, but also predetermined sectors adjacent to those sectors as margins. However, defects such as concave scratches, for example, may be continuous over multiple sectors and adjacent tracks, while gradually changing from a deep scratch that can be easily detected to a shallow scratch. From such a point of view, the Plist includes margins. But, depending on the degree of scratches, sectors with shallow and even shallower scratches (minute scratches) that are continuous with the deep scratches may come off from the Plist area. For this reason, in this embodiment, in addition to the Plist area, an area containing sectors with shallow scratches, that is, sectors that may contain minute defects, is set adjacent to the Plist area. The area adjacent to the Plist area is classified as a second area of the recording area of the disk 10, and is hereinafter referred to as a Plist peripheral area.

The Plist peripheral area, which will be described in detail later, is an area where the additive value to the write count is adjusted and the execution timing of the refresh process is accelerated as compared to the area consisting of appropriate sectors where defects do not exist, (which will be hereinafter referred to as a normal recording area). The normal recording area is an area other than the Plist area (first area) and Plist peripheral area (second area), and is classified as a third area of the recording area of the disk 10.

That is, the recording surface of the disk 10 contains the normal recording area, the Plist area, and the Plist peripheral area, which are mixedly present. The Plist peripheral area is an area adjacent to the Plist area and sandwiched between the Plist area and the normal recording area. Each of these areas is set over one or more sectors. Each of these areas may include an entire area of a single sector or a part of a single sector.

FIGS. 2 and 3 schematically show examples of the settings of the normal recording area, Plist area, and Plist peripheral area on the recording surface of the disk 10. FIG. 2 shows an example of the case where the defects are continuous along the radial direction (the media track direction) of the disk 10. FIG. 3 shows an example of the case where the defects are continuous along a direction inclined to the radial direction of the disk 10. In FIGS. 2 and 3, the radial direction of the disk 10 corresponds to the horizontal direction and the circumferential direction (the media rotation direction) corresponds to the vertical direction, and each of cells obtained by vertical and horizontal compartmentalization is the area for one sector of one track. In other words, FIGS. 2 and 3 each illustrate a recording area of eight sectors of 29 consecutive tracks along the circumferential direction as part of the recording surface of the disk 10. In each figure, marks ×, + and − all indicate defects, and the degree of the defect (the degree of influence on data reading and writing) becomes less in this order. For example, an × mark indicates a deep scratch, a + mark indicates a shallow scratch, and a − mark indicates a very shallow scratch. Ultra-shallow scratches correspond to minor defects compared to defects containing deep and shallow scratches. Note that sectors with no mark are proper sectors where no defects exist.

In the example shown in FIG. 2, an area R21 is the Plist area, an area R22 is the Plist peripheral area, and the other area R23 than these is the normal recording area. The areas R21 and R22 are the areas surrounded by bold lines, and the area R23 is the other area. The area R21, which is the Plist area, contains sectors with deep scratches, shallow scratches, and very shallow scratches as defects, respectively. The areas R22, which is the Plist peripheral area, contains sectors with very shallow scratches. The areas R22 are set to sandwich the area R21 along a direction to the radial direction of the disk 10, which is the continuous direction of defects. The area R23, which is the normal recording area, is set to surround these areas R21 and R22.

In the example shown in FIG. 3, the area R31 is the Plist area, the area R32 is the Plist peripheral area, and the other area R33 is the normal recording area. The areas R31 and R32 are areas each encircled by bold lines, and the area 33 is the other area. The area R31, which is the Plist area, contains sectors with deep scratches, shallow scratches, and very shallow scratches as defects, respectively. The areas R32, which is the Plist peripheral area, contains sectors with very shallow scratches. The areas R32 are set to sandwich the area R31 along a direction inclined to the radial direction of the disk 10, which is the continuous direction of defects. The area R33, which is the normal recording area, is set to surround the areas R31 and R32.

The setting range of the Plist area and the Plist peripheral area shown in FIGS. 2 and 3, for example, or the shape of the compartment with other areas, are only an example, and the setting range (compartment shape) of these areas can be set arbitrarily according to the existing state of defects. For example, the Plist peripheral areas may be set to surround the Plist area. Or, the Plist area may exist in multiple locations, and in this case, the Plist peripheral areas are set adjacent to the respective Plist areas.

The non-volatile memory 90 holds information on the Plist peripheral areas, (which will be hereinafter referred to as "Plist peripheral area information"). The Plist peripheral area information is registered while various information items, for example, the corresponding cylinder number, sector number, sector length, head number and the like are linked thereto. The cylinder number (address) indicates the cylinder position of the track on the disk 10 where the corresponding Plist peripheral area is set. The sector number is the position of the sector in which the corresponding Plist peripheral area is set, or the first sector position thereof when the set sectors are continuous over multiple sectors. The sector length is the number of sectors contained in the set Plist peripheral area.

The system controller (controller) 100 is realized, for example, using a large-scale integrated circuit (LSI) called a system-on-a-chip (SoC), in which multiple elements are integrated on a single chip. The system controller 100 includes a read/write (R/W) channel 40, a hard disk controller (HDC) 50 and a microprocessor (MPU) 60. The system controller 100 is electrically connected to the driver IC 20, the head amplifier IC 30, the volatile memory 70, the buffer memory 80, the non-volatile memory 90 and the host 200.

The R/W channel 40 executes signal processing of read data transferred from the disk 10 to the host 200 and write data transferred from the host 200 according to a command from the MPU 60, which will be described later. The R/W channel 40 is electrically connected to, for example, the head amplifier IC 30, the HDC 50, and the MPU 60 and the like.

The HDC 50 controls the data transfer between the host 200 and the R/W channel 40 according to a command from the MPU 60, which will be described later. The HDC 50 is electrically connected, for example, to the R/W channel 40, the MPU 60, the volatile memory 70, the buffer memory 80, the non-volatile memory 90 and the like.

The MPU 60 is a main controller that controls each part of the magnetic disk drive 1. The MPU 60 controls the VCM 14 via the driver IC 20 and executes servo control to position the head 15. The MPU 60 controls the writing operation of data to the disk 10 and also selects the save destination of the write data. The MPU 60 controls the reading operation of data from the disk 10 and controls the processing of read data. The MPU 60 is connected to each part of the magnetic disk drive 1. The MPU 60 is electrically connected to, for example, the driver IC 20, the R/W channel 40, the HDC 50 and the like.

The MPU 60 comprises a read/write control portion 61, a management portion 62, and a refreshing processing portion 63. The MPU 60 executes the processing of each of these portions, such as the read/write control portion 61, the management portion 62, and the refreshing processing portion 63, on firmware. The MPU 60 may comprise each of these portions as a circuit.

The read/write control portion 61 controls the data read processing and write processing according to the commands from the host 200. The read/write control portion 61 controls the VCM 14 via the driver IC 20, positions the head 15 to a target position on the disk 10, and reads or writes data.

The control portion 62 counts the number of writes of data to the predetermined recording area of the disk 10, (which will be hereinafter referred to as a write count). In this case, the write count is the number of adjacent writes to the predetermined recording area, and the adjacent write is writing of data to the area adjacent to the predetermined recording area in the radial direction, (which will be hereinafter referred to as an adjacent area). The predetermined recording area is, for example, a predetermined track, and the adjacent area is, for example, a track adjacent to the predetermined track, (which will be hereinafter also referred to as an adjacent track). The management portion 62 counts the write count for each track in the disk 10, for example. Note that the management portion 62 is configured to count the write count when data is written to the adjacent area, it may as well count the write count when data is written to an area that is radially farther away than the adjacent area.

The management portion 62 holds the write count for each track. Each time data is written (adjacent write) to an adjacent track to a predetermined track, the management portion 62 adds a predetermined value (hereinafter referred to as an additive value) to the write count corresponding to the predetermined track. Further, the management portion 62 holds a threshold value for executing the refresh process (hereinafter referred to as the refresh threshold) for each track. The refresh process is a process in which, according to the number of times data corresponding to a predetermined recording area (for example) of the disk 10 is written (write count), the data written to the recording area is read once and the read data is rewritten to the predetermined recording area. The refresh threshold is set, for example, as the write count less than or equal to the assured number of times. The assured number of writes is the upper limit of the write count to assure that the data on a given track will not be erased by side erase, that is, the write count that will not cause an error in reading the data. The side erase is a phenomenon in which, for example, the data of a given track is erased due to the influence of magnetic flux leakage (adjacent track interference: ATI) from the head 15 when data is written to an adjacent track of the given track. The number of assured times is set, for example, based on a plurality of error rates (bit error rate: BER) measured, obtained by measuring error rates corresponding to the write count, respectively, on a given track. The management portion 62 holds the assured number of times for each track.

The management portion 62 manages the recording surface by dividing the recording area of the disk 10 into the Plist area, which is the first area, the Plist peripheral area, which is the second area, and the normal recording area, which is the third area. Then, the management portion 62 adjusts the additive value to the write count of a track based on the presence or absence of defects on the recording surface of the disk 10. Here, the management portion 62 judges whether or not a given track contains sectors in the Plist peripheral area, and adjusts and changes the additive value according to the judgment. More specifically, when a sector of the Plist peripheral area is contained, the additive value to the write count is increased to more compared to the additive value of the normal recording area. The additive value to the write count in the Plist peripheral area has a greater degree of rise as compared to that of the normal recording area, and reaches the refresh threshold sooner. The additive value to the write count in the Plist peripheral area may be a fixed value or a variable value, and can be set arbitrarily according to the degree of defects that may exist in the Plist peripheral area (that is, the degree of influence on data read and write). On the other hand, if the predetermined track does not contain any sectors of the Plist peripheral area, the management portion 62 sets the additive value to the write count of the predetermined track as the additive value of the normal recording area.

The adjustment of the additive value to the write count in the Plist peripheral area will now be explained.

Figure 4:
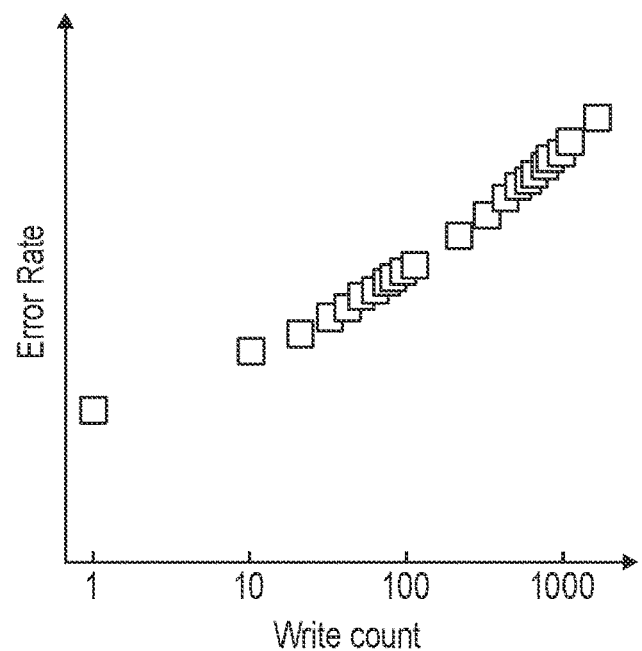
FIG. 4 is a diagram showing the relationship between the write count of a track containing a sector with a deep scratch as a defect and the error rate in the magnetic disk device according to the embodiment.
Figure 5:
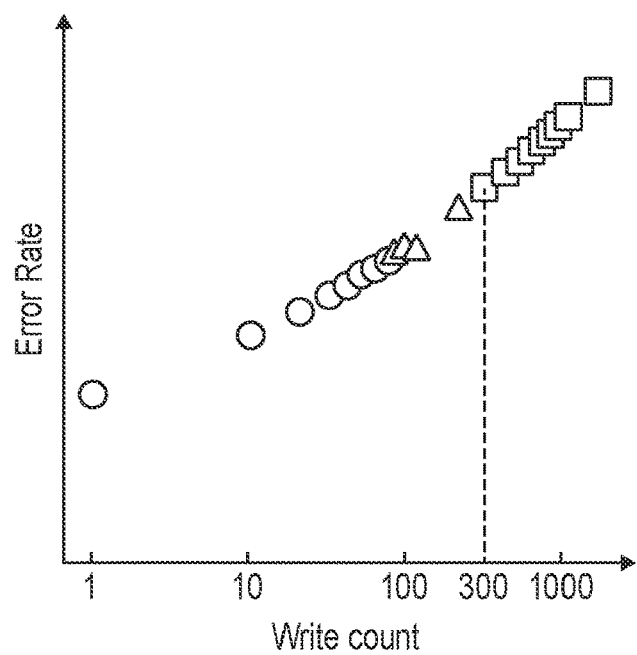
FIG. 5 is a diagram showing the relationship between the write count of a track containing a sector with a very shallow scratch as a defect and the error rate in the magnetic disk device according to the embodiment.

FIGS. 4 to 6 each show the relationship between the write count of a track (target track) of the disk 10 and the error rate in a quality check for the disk 10. FIG. 4 is a diagram showing the relationship in tracks that contain sectors with deep scratches as defects (defects indicated by mark × in FIGS. 2 and 3), or, in other words, in the Plist peripheral area. FIG. 5 is a diagram showing the relationship in tracks containing sectors with very shallow scratches as defects (defects indicated by mark – in FIGS. 2 and 3), in other words, in the Plist area. FIG. 6 is a diagram showing the relationship in tracks containing only proper sectors with no scratches (defects) (sectors indicated by no marks in FIGS. 2 and 3), in other words, the normal recording area.

In each figure, mark circle, triangle and square each indicate the state of occurrence of errors when reading data from the target track. For example, the mark circle indicates no error, the mark triangle indicates an error that can be recovered by the refresh process even if a side erase occurs, and the mark square indicates an error that cannot be recovered if a side erase occurs. As shown in FIGS. 4 to 6, the error rate, that is, the frequency of occurring errors when reading data (read errors), increases as the write count increases.

In the example shown in FIG. 4, the target track contains a sector with deep scratches registered in the Plist. Therefore, as shown in FIG. 4, when reading data to the track containing the sector, errors (read errors) that cannot be recover data recovery when a side erase occurs always occur regardless of the write count. Therefore, the sectors of the target track are excluded from the recording area of the disk, for example, by not assigning an LBA to the sectors.

In the example shown in FIG. 5, the target track contains a sector with very shallow scratches (minute defects) registered in the Plist peripheral area information. In this case, as shown in FIG. 5, if the write count exceeds about 300, an error (read error) which cannot recover data when a side erase occurs, occurs when reading data from the track containing the sector. Therefore, the assured number of times for the Plist peripheral area is about 300 times.

On the other hand, in the example shown in FIG. 6, the target track contains only proper sectors with no scratches (defects). In this case, as shown in FIG. 6, if the write count exceeds about 500, an error (read error) which cannot recover data when a side erase occurs, occurs when reading data from the track containing the sector, or in other words, from the normal recording area. Therefore, the assured number of times for the normal recording area is about 500 times.

According to the examples shown in FIGS. 5 and 6, the write count until an error that cannot recover data occurs when a side erase occurs is about 1.7 times ($500/300 \approx 1.7$) greater in a track containing only proper sectors with no scratches (defects) as compared to a track containing sectors with very shallow scratches (minute defects).

When the assured number of writes in the normal recording area is represented by Tn and the assured number of writes in the Plist peripheral area is represented by Tx, the additive value to the write count in the Plist peripheral area should be set to about Tn/Tx times the additive value to the write count in the normal recording area. Therefore, in the case of the examples shown in FIGS. 5 and 6, the additive value to the write count to the Plist peripheral area should be about 1.7 times the additive value to the write count in the normal recording area. That is, if the additive value for the normal recording area is 1, the additive value for the Plist peripheral area should be about 1.7. Thus, the apparent write counts of the Plist peripheral area and the normal recording area until they reach the refresh threshold are adjusted to be about the same. Thus, in the Plist peripheral area, it makes it possible to execute the refresh process with a data written state almost the same level as that of the normal recording area.

The management portion 62 compares and judges the write count of the target track with the refresh threshold. When it is judged that the write count of the target track exceeds the refresh threshold, the management portion 62 outputs a signal for executing refreshing process on the target track (hereinafter referred to as a refresh signal) to the refreshing processing portion 63. Upon receiving the signal which has already been subjected to the refreshing process, the management portion 62 resets the write count of the target track for which the refreshing process has been executed to the initial value. The initial value is, for example, the number of counts (for example, zero) when no data is written to the adjacent track of the target track.

The management portion 62 manages the write count and the refresh threshold for each track, and the assured number of writes for the normal recording area and the Plist peripheral area in each track, using a table or the like. The management portion 62 records the table in a memory, for example, the non-volatile memory 90 or system area 10b, and reads these values from the table as parameters used when the refreshing process is executed.

The refreshing processing portion 63 executes the refreshing process. For example, when the refreshing processing portion 63 receives a refresh signal from the management portion 62, it executes the refreshing process on the target track corresponding to the refresh signal. When executing the refreshing process, the refreshing processing portion 63 outputs a signal to the management portion 62 to the effect that the refreshing process is completed, for example.

Figure 7:
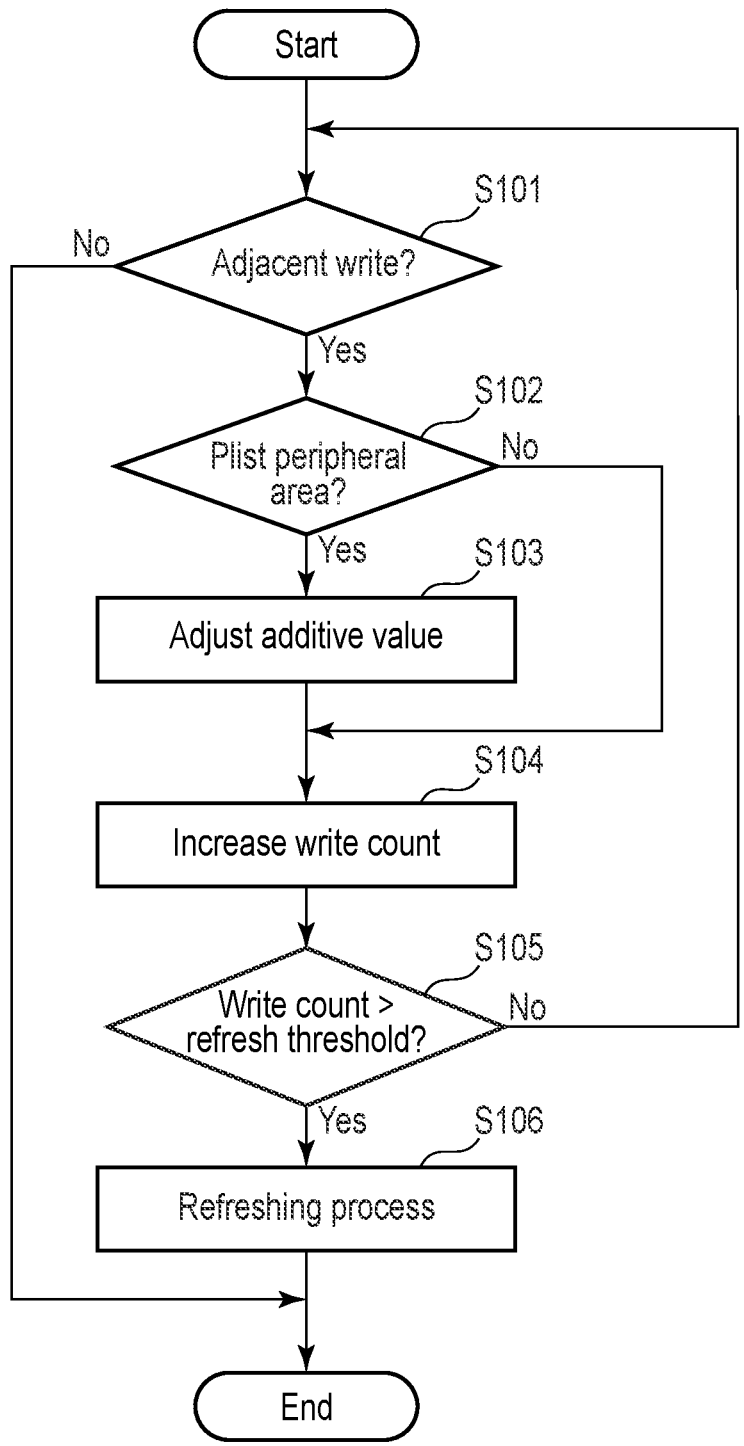
FIG. 7 is a flowchart of the control executed by a system controller when performing refreshing process in the magnetic disk device according to the embodiment.

The control executed by the system controller 100 when refreshing process is carried out on a predetermined track will be described below by way of a flowchart. FIG. 7 is a flowchart of the control executed by the system controller 100 when carrying out such a refresh process.

As shown in FIG. 7, in the refreshing process, the system controller 100, specifically, the management portion 62 of the MPU 60, judges whether or not an adjacent write has been made to a predetermined track (hereinafter referred to as the target track) (S101).

If no adjacent write has been made, the refresh process is finished without being executed. In this case, the management portion 62 does not output a refresh signal for the target track to the refreshing processing portion 63. But, in this case, the management portion 62 may output a signal to the refreshing processing portion 63, which indicates that the refreshing process is not executed for the target track.

On the other hand, when an adjacent write is performed, the management portion 62 judges whether or not the target track contains a sector of the Plist peripheral area (S102). In the judgment, the management portion 62 reads the Plist peripheral information stored in the non-volatile memory 90, for example, and determines whether or not the sector number of the target track matches the sector number registered in the Plist peripheral information.

If such a sector is contained, the management portion 62 adjusts the additive value to the write count of the target track (S103). For example, based on the assured number of writes (Tn) in the normal recording area and the assured number (Tx) of writes in the Plist peripheral area, the management portion 62 adjusts the additive value to the write count of the target track to about Tn/Tx times the additive value to the write count for the normal recording area. Thus, in the case of the examples shown in FIGS. 5 and 6, the additive value to the write count of the target track is adjusted to about 1.7 times the additive value to the write count in the normal recording area.

If the target track does not contain any sectors of the Plist peripheral area in S102, the management portion 62 does not adjust the additive value to the write count for the target track. In this case, the target track contains only sectors of the normal recording area, and the additive value to the write count of the target track is set as the additive value to the write count in the normal recording area.

Then, the management portion 62 increases the write count of the target track (S104). For example, if the target track contains sectors of the Plist peripheral area, the write count is added according to the additive value adjusted in step S103. On the other hand, if the target track does not contain such sectors, the write count is added according to the unadjusted additive value (for example, 1).

Next, the management portion 62 compares and judges the write count of the target track with the refresh threshold (S105). Here, for example, the management portion 62 judges whether or not the write count exceeds the refresh threshold.

If the write count of the target track does not exceed the refresh threshold, the management portion 62 again judges whether or not an adjacent write has been made to the target track (S101). In other words, in this case, the control from S101 is repeated accordingly on the assumption that refreshing process for the target track is not necessary at this time.

On the other hand, if the write count of the target track exceeds the refresh threshold, refreshing process is executed on the target track (S106). More specifically, the management portion 62 outputs a refresh signal to the refreshing processing portion 63, and the refreshing processing portion 63 receives the refresh signal and executes the refreshing process. When the refreshing process is executed and a signal is received from the refreshing processing portion 63 to the effect that the refreshing process is completed, for example, the management portion 62 resets the write count of the target track to the initial value (for example, zero). Thus, a series of control operations for the refreshing process for the target track is finished.

As described, according to the magnetic disk drive 1 according to the embodiment, the additive value to the write count of the track can be adjusted according to whether or not the predetermined track of the disk 10 contains sectors of the Plist peripheral area. More specifically, if the track contains sectors in the Plist peripheral area, the additive value to the write count can be increased to more than the additive value for the normal recording area. Thus, the write count of a track that contains sectors in the Plist peripheral area can be made to reach the refresh threshold sooner than the case of a track that does not contain such sectors. In other words, the apparent write count until they reach the refresh threshold can be adjusted to be about the same for both tracks.

Therefore, before an error (read error) occurs, which cannot recover data when a side erase occurs when reading data, the refreshing process can be appropriately carried out on the track containing the sectors in the Plist peripheral area, thereby improving the accuracy of data assurance against side erase.

Further, the Plist peripheral area is set to include sectors that contain minute defects located out of the Plist area, for example, very shallow scratches that are contiguous to deep scratches contained in the sectors of the Plist area, that is, sectors with minute scratches (thin scratches). In other words, in the embodiment, the Plist peripheral area is set adjacent to the Plist area as an area containing sectors where such minute defects may exist.

With the above described structure, even if a predetermined track contains sectors with minute defects located out of the Plist area, the appropriate refreshing process can be executed on the track as long as such sectors are contained the Plist peripheral area. The Plist area is excluded from the recording area of the disk 10 and as the Plist area becomes larger, the recording capacity of the disk 10 is lowered. According to the embodiment, the Plist peripheral area is set in addition to the Plist area, and in the Plist peripheral area, the accuracy of data assurance against side erase can be improved. Thus, from the viewpoint of such data assurance, it is possible to narrow the Plist area, and the recording area of the disk 10 can be expanded by the amount of the narrowed Plist area.

The Plist area is an area that contains, in addition to the sectors where defects are actually detected, the predetermined sectors adjacent to those sectors, and the Plist peripheral area is set adjacent to the Plist area. In the magnetic disk drive 1, the Plist area can be dispersed to be present in a plurality of locations, and therefore the Plist peripheral area can as well be dispersed to be present in a plurality of locations. As described above, according to this embodiment, according to whether or not a predetermined track of the disk 10 contains sectors of the Plist peripheral area, it is possible to adjust the additive value to the write count of the track, and therefore refreshing process can be appropriately executed for such a track. Thus, in addition to narrowing the Plist area and the Plist peripheral area, it is also possible to reduce the number of Plist areas and Plist peripheral areas.

In the above-described embodiment, the additive value to the write count of a predetermined track is adjusted, but in place of or in addition to this, the refresh threshold may be adjusted. In this case, it suffices if the refresh threshold for the predetermined track is adjusted according to whether or not the predetermined track of the disk 10 contains sectors of the Plist peripheral area. For example, if the predetermined track contains sectors of the Plist peripheral area, the refresh threshold of the predetermined track is lowered compared to the refresh threshold of the track that does not contain the sectors, that is, the normal recording area. With this structure, even if the additive values to the write count are set to the same value without adjustment, the refreshing process can be executed on the track that contains the sectors of the Plist peripheral area with a smaller write count than that of the track that does not contain the sectors. Therefore, as in the embodiments described above, the accuracy of data assurance against side erase in tracks containing sectors in the Plist peripheral area can be improved.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device comprising:
a magnetic disk;
a head which writes data to the magnetic disk and reads data from the magnetic disk; and
a controller which once reads data written to a predetermined recording area according to the number of writes of data to the predetermined recording area of the magnetic disk, and rewrites the read data to the predetermined recording area, wherein
the controller adjusts an additive value to the number of writes based on presence or absence of a defect on a recording surface of the magnetic disk, divides the recording area of the magnetic disk into a first area that contains the defect and is unused as the recording area, a second area adjacent to the first area and a third area other than these areas, and adjusts the additive value to the number of writes of data to the second area to increase to greater than an additive value to the number of writes of data to the third area.

2. The magnetic disk drive of claim 1, wherein
the predetermined recording area is a predetermined track of the magnetic disk, and
the controller judges whether or not the track contains a sector of the second area, and when it is judged that the track contains the sector, increases the additive value to the number of writes of data to the track to greater than the additive value to the number of writes of data to the third area, and when it is judged that the sector is not included, sets the additive value to the number of writes of data to the track to the additive value to the number of writes of data to the third area.

3. The magnetic disk device of claim 1, wherein
the controller holds, when data is written to an area adjacent to the predetermined recording area, an assured number of writes of data, which is assured that the data in the predetermined recording area is not to be erased by a magnetic flux leakage from the head, and sets, when the assured number of writes in the second area is Tx, and the assured number of writes in the third area is Tn, the additive value to the number of writes of data to the second area Tn/Tx times the additive value to the number of writes of data to the third area.

4. The magnetic disk device of claim 2, wherein
the controller holds, when data is written to an area adjacent to the predetermined recording area, an assured number of writes of data, which is assured that the data in the predetermined recording area is not to be erased by a magnetic flux leakage from the head, and sets, when the assured number of writes in the second area is Tx, and the assured number of writes in the third area is Tn, the additive value to the number of writes of data to the second area Tn/Tx times the additive value to the number of writes of data to the third area.

5. The magnetic disk drive of claim 3, wherein
the second area contains defects smaller than the defect in the first area and continuous from the defect, and located adj acent to respective sides of the first area along continuous directions thereof while sandwiching the first area.

6. The magnetic disk device of claim 4, wherein
the second area contains defects smaller than the defect in the first area and continuous from the defect, and located adj acent to respective sides of the first area along continuous directions thereof while sandwiching the first area.

7. A control method for a magnetic disk device, the method comprising:
dividing a recording area of a magnetic disk into a first area containing a defect and not to be used as a recording area of the magnetic disk, a second area adjacent to the first area and a third area other than these areas;
judging, when writing data to a track of the magnetic disk, whether or not the track contains a sector of the second area, increasing, when judged that the sector is contained, an additive value to the number of writes of data to the track to greater than an additive value to the number of writes of data to the third area, and setting, when judged that the sector is not contained, the additive value to the number of writes of data to the track to the additive value to the number of writes of data to the third area;
adding the number of writes of data to the track according to the additive value; and
reading once the data written to the track, according to the number of writes of data to the track and rewriting the read data to the track.

* * * * *